United States Patent [19]
Lee

[11] 3,873,086
[45] Mar. 25, 1975

[54] WAGGING TAIL NOVELTY

[76] Inventor: Theodore W. Lee, 2659 W. Okeechobee Rd., Hialeah, Fla. 33010

[22] Filed: Mar. 14, 1973

[21] Appl. No.: 341,311

[52] U.S. Cl. ................................ 272/8 N, 46/247
[51] Int. Cl. ............................................. A63j 5/00
[58] Field of Search ............ 272/1 R, 1 D, 8 R, 8 N, 272/25, 27 R, 27 N; 46/123, 245, 247, 92, 99; 40/106.3, 106.31, 106.33, 106.34, 106.35, 106.36, 126 R; 280/150 R, 289, 1.13; 340/121

[56] References Cited
UNITED STATES PATENTS

| | | | |
|---|---|---|---|
| 777,369 | 12/1904 | Hayes | 280/1.13 UX |
| 1,197,862 | 9/1916 | Scott | 340/121 |
| 1,486,305 | 3/1924 | Schubert | 272/25 |
| 1,635,770 | 7/1927 | Starke | 46/123 |
| 2,098,166 | 11/1937 | Rubenstein | 46/123 X |
| 2,709,601 | 5/1955 | Goerditz | 280/1.13 X |
| 3,343,835 | 9/1967 | Kaplan | 272/8 N |
| 3,503,152 | 3/1970 | Aoki et al. | 46/247 |
| 3,693,292 | 9/1972 | DiLeva | 46/247 |

FOREIGN PATENTS OR APPLICATIONS 1,147,882  4/1963  Germany .............................. 46/99

OTHER PUBLICATIONS

"Sport Car Owners!" Motor Trend, September, 1957, p. 66.
"First Aid for Fender Benders," House Beautiful, February, 1966, p. 76.

Primary Examiner—Richard G. Pinkham
Assistant Examiner—R. T. Stouffer

[57] ABSTRACT

A novelty for attachment to the rear of a car or the like represents the hind quarters of a dog with tail extended. A small motor under the control of a driver or occupant of the car causes the tail to wag left and right.

1 Claim, 5 Drawing Figures

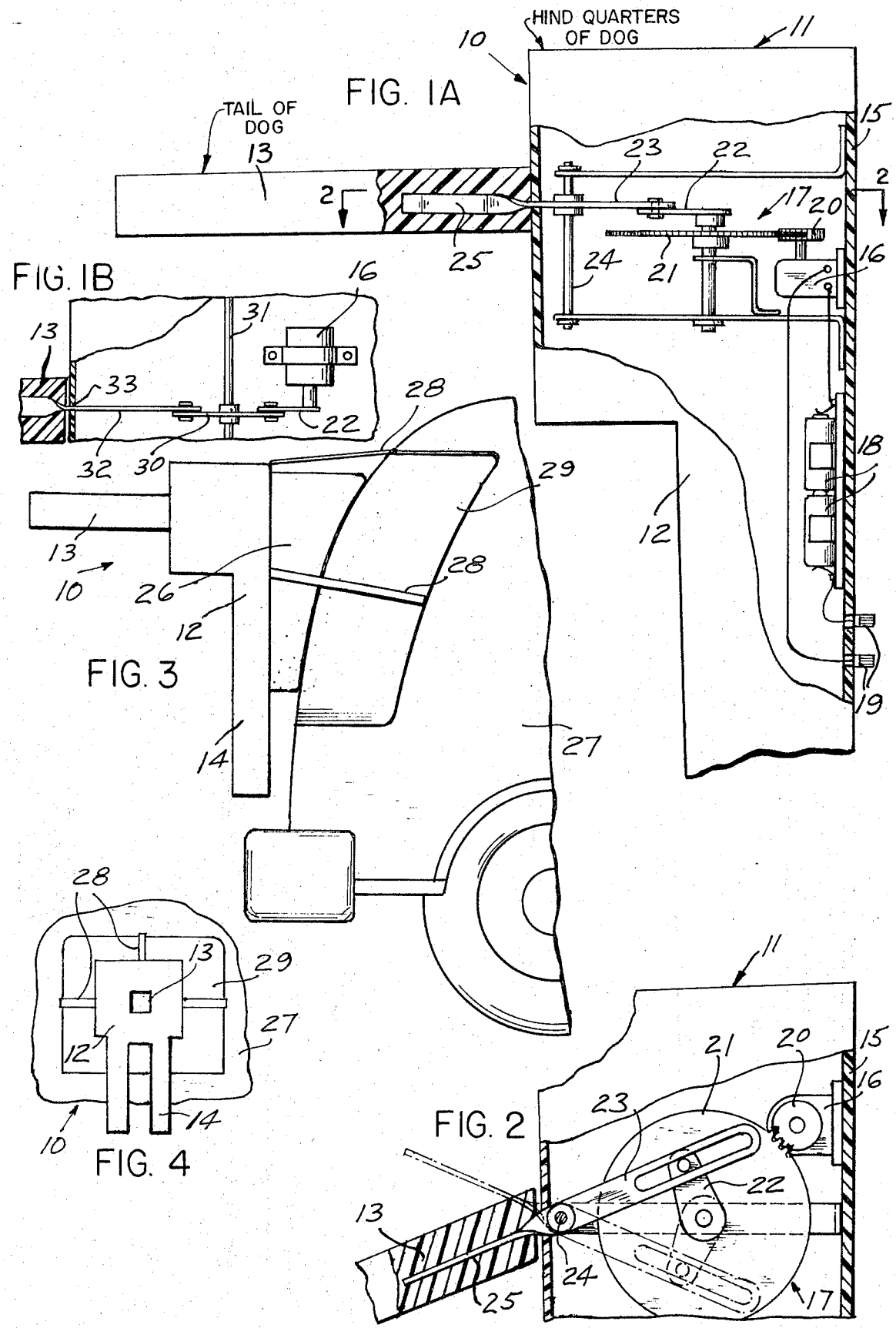

WAGGING TAIL NOVELTY

This invention relates to mechanical novelties and more particularly to motor operated animal toys and novelties.

A principal object of this invention is to provide a motor driven novelty in the form of the hind portion of a dog having a tail extending therefrom. The hind quarters, containing a motor, batteries and an oscillating mechanical drive for moving the tail, are attachable to the rear of a motor vehicle by means of straps passing around and inside the trunk door. The motol circuit is brought out to connections for a pair of wires leading to a switch in the interior of the car.

Another object of the present invention is to provide a novelty of the type described that is simple in construction, and therefore low in cost, thereby appealing to a wide market.

These and other objects will become evident upon a study of the following specification and the accompanying drawing wherein:

FIG. 1a is a side elevation view partly in section;

FIG. 1b is a fragmentary view thereof showing a modified drive means;

FIG. 2 is a plan view of FIG. 1a broken away to show the interior construction;

FIG. 3 is a side elevation view of a motor vehicle showing the mounting of the novelty;

FIG. 4 is a fragmentary rear elevation view thereof.

The present invention is strictly a fun novelty suited particularly to teenage boys wishing to greet friends as they pass them by in a motor vehicle. In the preferred embodiment to be described, the rear portion of the animal represents a poodle dog with a tail articulated to wag from left to right.

Referring to the figures, the novelty 10, according to the invention, shows a stationary housing 11 representing the hind quarter of a dog 12 and a moveable tail 13.

Hind quarter 12 extends downward to a pair of legs 14 to add realism to the general effect. Housing 11 encloses the mechanism and power source that is mounted on a baseboard 15. A motor 16 guides the tail wagging mechanism 17. In order to make the novelty applicable to several situations, and also independent of a car battery, an independent battery 18 is mounted on baseboard 15. The circuit between battery 18 and motor 16 is interrupted at a pair of externally accessible binding posts 19.

Mechanism 17 comprises a small gear 20 on motor 16, a larger gear 21 driven by gear 20, a crank arm 22 driven by large gear 21 and a slotted arm 23 operative of crank 22. Arm 23, pivotally supported on a pin 24, extends to an arm 25 to which the tail 13 is fixed.

Examination of FIGS. 1a and 2 will show that bridging binding posts 19 will cause motor 16 to rotate arm 22. In turn, arm 23 will be seen to oscillate between the position shown in solid outline in FIG. 2 and the figure shown in dotted line in the same figure. As a consequence, tail 13 will move between the limits similarly indicated in FIG. 2.

In application, the novelty is attached to a form fitting block of styrofoam or the like 26, and the whole is supported on the rear of a car 27 by passing two or more straps 28 from one side of the hind quarter under the trunk door and then out the other side, and then closing the trunk door. The attachment to trunk door 29 is best seen in FIG. 4. The simple means of attachment is intended for easy placement and removal.

Energizing motor 16 is accomplished by bringing a pair of wires, each connected to a binding post 19, into the interior of the car where any simple switch may be suitably located or held in the hand for operating the wagging tail.

Referring to FIG. 1b, there is shown a relatively simpler construction in which motor 16 is connected directly to crank arm 22. An oscillating arm 30 pivotally supported on a pin 31 then transmits the movement to an arm 32 that is pivotally supported in a simple manner by a hole 33 in hind quarter 12. In this modified form, there are fewer driving parts. This is applicable where motor 16 is chosen to rotate slower than the motor 16 in FIG. 1a.

What I now claim is:

1. A wagging tail novelty, comprising in combination, a hollow housing having the configuration of a hind quarter of an animal, and a moveable tail attached thereto, a mechanism inside said hollow housing for reciprocally waving said tail, said mechanism including an electric motor powered by dry cell batteries and which are in an electric circuit together with switch means, said motor driving a mechanical linkage that includes a reciprocally pivotable link extending outwardly of a rear opening of said housing and to which said tail is attached so to wag, said switch means comprising a pair of binding posts protruding outwardly of said housing and which are manually connectable by an electrical conductor wire, a block attached to a forward side of said housing, said block having a front side configurated to fit a rear portion of an automotive vehicle trunk door to which said wagging tail novelty is intended to be secured, and mounting means for securement thereto, said mounting means comprising a plurality of straps each of which extends from one side of said housing and is adaptable to be passed under said trunk door and then out the other side thereof before closing said trunk door.

* * * * *